United States Patent [19]

DiGioia

[11] Patent Number: 4,729,187
[45] Date of Patent: Mar. 8, 1988

[54] LONGLINE ASSEMBLY

[75] Inventor: John A. DiGioia, North Kingstown, R.I.

[73] Assignee: Ashaway Line & Twine Mfg. Co., Ashaway, R.I.

[21] Appl. No.: 15,892

[22] Filed: Feb. 18, 1987

[51] Int. Cl.⁴ .............................................. A01K 91/00
[52] U.S. Cl. .................................................... 43/44.98
[58] Field of Search ..................... 43/44.98, 44.83, 43.1

[56] References Cited

U.S. PATENT DOCUMENTS 3,435,552  4/1969  Caldwell .......................... 43/44.98
4,321,854  3/1982  Foote ................................ 43/44.98

FOREIGN PATENT DOCUMENTS 61944  5/1981  Japan ................................. 43/44.98
6555  of 1900  United Kingdom ............... 43/44.98

Primary Examiner—Gene P. Crosby
Attorney, Agent, or Firm—Slater & Michaelson

[57] ABSTRACT

A longline assembly includes an elongated main longline element, a plurality of longitudinally spaced gangion lines attached to the longline element, and a plurality of hooks on the outer extremities of the gangion lines. The gangion lines each include a monofilament core element and a braided outer casing which is formed in a tight solid braid pattern over the core element to firmly secure the outer casing to the core element. The core elements add preselected degrees of stiffness to the gangion lines to maintain them in substantially outwardly extended relation to the longline element during fishing operations, and the outer casings provide improved surface characteristics which facilitate handling and knotting or otherwise terminating of the gangion lines.

6 Claims, 3 Drawing Figures

LONGLINE ASSEMBLY

BACKGROUND AND SUMMARY OF THE INVENTION

The instant invention relates to fishing apparatus and more particularly to an improved longline assembly for use in commercial fishing operations.

The use of longline equipment has been well known in various segments of the commercial fishing industry for many years. In this regard, typically, commercial longline operations involve the use of one or more longline assemblies comprising an elongated longline element having a plurality of relatively short, spaced gangion lines attached thereto, and a plurality of hooks attached to the outer extremities of the gangion lines. The longline element of a longline assembly of this type generally comprises an elongated braided or helically wound rope which may be as long as two miles or more, and the gangion lines of a longline assembly of this type generally comprise relatively small diameter lines of between two and five feet in length. Further, the gangion lines of a longline assembly of this type are generally attached to the longline element thereof at spaced intervals which are greater in length than the combined length of the two adjacent gangion lines in order to prevent the gangion lines from becoming entangled. For use of a longline assembly of this type, the hooks thereof are individually baited with an appropriate bait, and the entire longline assembly is set in an extended disposition in a desired fishing area. After a predetermined period of time has elapsed, which may be as long as several days or more, the longline assembly is retrieved either manually or through the use of automated equipment, and the fish which have been caught on the baited hooks are removed from the longline assembly and processed.

It has been found that the specific physical characteristics of the material from which the gangion lines of a longline assembly are constructed can have a significant bearing on the overall effectiveness of the longline assembly. In this regard, it has generally been found that gangion lines should have sufficient degrees of stiffness to maintain them in substantially outwardly extending relation to the longline element to which they are attached in order to maintain the baited hooks associated therewith in outwardly spaced relation during fishing operations. Further, it has been found that gangion lines should be made up of materials which can be relatively easily knotted or otherwise terminated and that they should not be overly slippery or otherwise difficult to handle. Still further, it has generally been found that gangion lines should not have surface characteristics which detract from their overall efficiency for catching certain species of fish. In particular, gangion lines should not have very hard surface characteristics which can cause them to produce noise as they scrape along the ocean bottom during undulation in the water.

While a variety of different types of materials have been heretofore utilized for gangion lines, generally none of the heretofore known materials have had the appropriate physical characteristics necessary to make them operable with optimum efficiency. For example, gangion lines made from stainless steel wire have generally been found to be stiff enough to maintain hooks attached thereto in outwardly spaced relation, but they have often been found to be so stiff that they can be difficult to handle and at times even dangerous. Further, stainless steel wire gangion lines have been found to produce noise during undulation in the water. Gangion lines made from braided Nylon or Dacron (DuPont TM) lines on the other hand have generally been found to be easy to knot and not prone to producing noise in the water, but they have often been found to be so soft and supple that they fail to maintain hooks attached thereto in outwardly spaced relation and they can easily become entangled during on-board handling operations. Gangion lines made from synthetic monofilament lines have generally been found to have relatively moderate stiffness levels which are sufficient to maintain hooks attached thereto in outwardly spaced relation to a longline element during fishing operations. However, monofilament lines have generally been found to be difficult to knot and slippery to handle. Further, monofilament lines have often been found to develop stress cracks when they are terminated utilizing crimping sleeves, although the use of crimping sleeves in combination with monofilament lines is a common fishing practice. Gangion lines made from resin coated braided lines have generally been found to be initially relatively satisfactory since they have higher degrees of stiffness than uncoated braided lines, and they can easily be knotted and handled. However, it has been found that the resins utilized to coat braided lines tend to dissolve at least to some extent after prolonged exposure to the water and that therefore resin coated braided lines tend to rapidly loose their stiffness characteristics.

The instant invention provides an improved longline assembly comprising gangion lines having substantially improved physical characteristics. Specifically, the instant invention provides a longline assembly which comprises gangion lines made from a material having improved stiffness and handling characteristics comprising a core element of a predetermined stiffness and an outer casing on the core element. The core element preferably comprises a synthetic monofilament core element, and the outer casing comprises a plurality of individual strands which are tightly interlaced in a solid braid pattern over the core element so as to substantially prevent longitudinal movement between the outer casing and the core element. In this regard, it is important to recognize that the outer casing is formed from a plurality of strands in a solid braid pattern as opposed to a hollow braid pattern in order to firmly lock the outer casing to the core element so that relative longitudinal movement therebetween is substantially prevented. The individual strands of the outer casing preferably comprise strands of continuous synthetic filaments, and they are preferably coated with a suitable water resistant resin after the casing is formed on the core element.

While cords comprising central core elements and braided outer casings which are formed in solid braid patterns have been heretofore available for certain specific applications, the use of such cords in connection with fishing operations of any type has not been heretofore known. In this regard, the use of cords of this general type comprising core elements made from stainless steel or bronze wire rope as well as from Nylon has generally been known in applications wherein cords are passed over turning pulleys such as in sash cord assemblies, halyard assemblies and tiller cord assemblies. However, in these applications, core elements are utilized to minimize longitudinal stretching characteristics and to add tensil strength rather than to add or control stiffness levels. Further, the concept of utilizing cords of this type in fishing apparatus and particularly in a longline fishing assembly has not been heretofore known.

Accordingly, it is a primary object of the instant invention to provide an improved longline assembly.

Another object of the instant invention is to provide a longline assembly comprising gangion lines which have and retain predetermined degrees of stiffness.

Another object of the instant invention is to provide a longline assembly comprising gangion lines which have predetermined desired degrees of stiffness, but which can nevertheless be effectively knotted.

An even further object of the instant invention is to provide a longline assembly comprising gangion lines made from a material including a monofilament core and an outer casing over the core comprising a plurality of multifilament strands which are tightly interlaced in a solid braid pattern.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
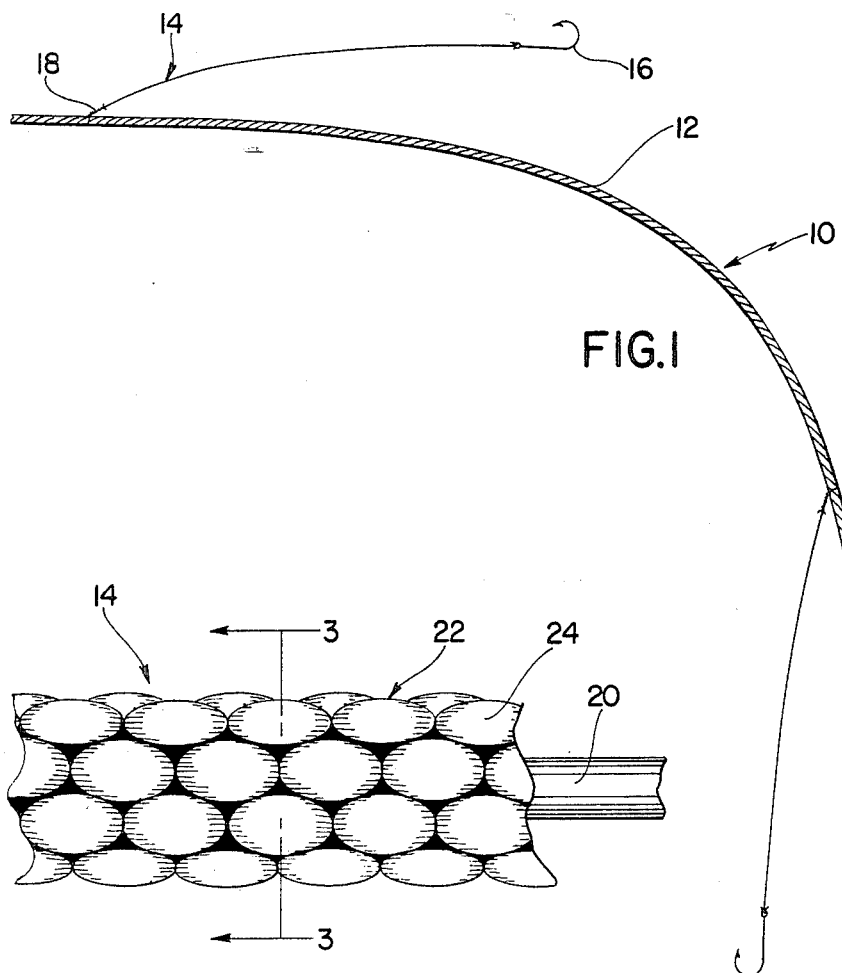
FIG. 1 is a fragmentary plan view of the longline assembly of the instant invention.

Referring now to the drawing, the longline assembly of the instant invention is illustrated in FIG. 1 and generally indicated at 10, and it comprises a longline element 12, a plurality of gangion lines generally indicated at 14, and a plurality of hooks 16 on the outer extremities of the gangion lines 14. The longline assembly 10 is operable in a manner similar to a conventional longline assembly, and it can be utilized in various manual and automated fishing operations in accordance with well-known fishing techniques.

The longline element 12 is preferably of conventional construction, and it preferably comprises an elongated rope or line having either a braided or a spirally wound construction, and it may be as long as two miles or more. The longline element 12 as herein embodied comprises a plurality of spirally wound multifilament strands made from a synthetic material having a density which is preferably somewhat greater than the density of sea water, and the longline element 12 preferably has a tensile strength which enables it to be effectively utilized for catching and retrieving large quantities of fish, as is generally known in the fishing industry.

The gangion lines 14 are attached to the longline element 12 at spaced intervals in the longitudinal extent of the longline element 12. In the longline assembly 10 as herein embodied, the gangion lines 14 are attached to the longline element 12 with suitable fishing knots 18; although it will be understood that various other suitable attaching means, such as various known crimping sleeves, clips, snap-swivels, etc., can be utilized for securing the gangion lines 14 to the longline element 12, as is well known in the fishing industry. The gangion lines 14 preferably have lengths of between two and five feet, and they are preferably attached to the longline element 12 at intervals which are slightly greater than the combined length of the two adjacent gangion lines 14 in order to prevent the gangion lines 14 from becoming entangled during fishing operations.

The hooks 16 comprise conventional fish hooks, and they are preferably secured to the outer extremities of the gangion lines 14 with suitable known fishing knots or crimping sleeves. The hooks 16 are preferably selected so that they have appropriate dimensions and configurations in order to adapt the longline assembly 10 for use in various specific fishing applications, as is well known in the fishing industry; although preferably all of the hooks 16 in any specific longline assembly, such as the assembly 10, are of a uniform dimension and configuration.

Figure 2:
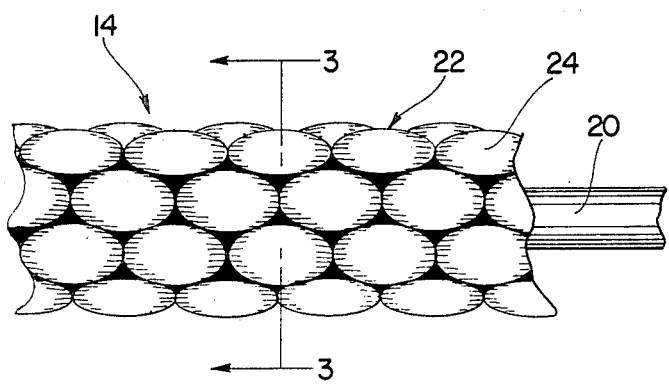
FIG. 2 is an enlarged fragmentary side elevational view of one of the gangion lines thereof.
Figure 3:
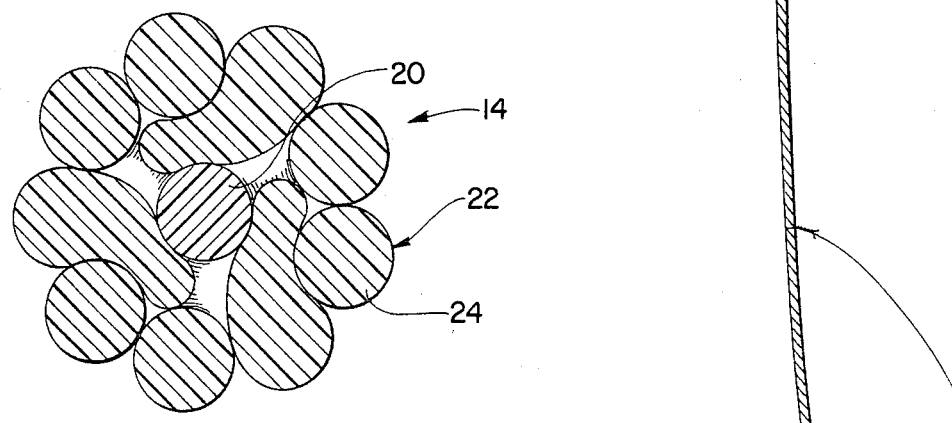
FIG. 3 is a sectional view taken along line 3—3 in FIG. 2.

Referring now to FIGS. 2 and 3, a typical gangion line 14 is more clearly illustrated. As will be seen, the gangion lines 14 comprise inner core elements 20 and outer casings generally indicated at 22. The inner core elements 20 of the gangion lines 14 preferably comprise synthetic monofilament core elements which are made from a suitable synthetic material, such as Nylon 6, Nylon 6,6, or a polyester, and they preferably have a sectional dimension of between 15 and 30% of the overall sectional dimension of the gangion lines 14. Further, the specific sectional dimension within this range is preferably selected to provide a stiffness level in the gangion lines 14 which causes them to remain in generally outwardly extended dispositions from the longline element 12 during use but which nevertheless enables them to be effectively and easily handled by fishermen and/or automated fishing equipment during setting and retrieving operations. The outer casings 22 of the gangion lines 14 preferably each comprise a plurality of multifilament strands 24 of a known polymer having a density which is at least slightly greater than the density of sea water, such as Nylon 6, Nylon 6,6, or a suitable polyester, and the strands 24 are tightly interlaced in a solid braid pattern over their respective core elements 20. The solid braid pattern embodied in the casings 22 is a conventional solid braid pattern preferably comprising either nine or twelve strands 24, and it should be distinguished from other braid patterns, such as tubular or hollow braid patterns, as will be apparent to those skilled in the art. In this regard, it will be understood that cords which are made in solid braid patterns generally comprise a plurality of strands which are interlaced so that they extend in directions which are either generally perpendicular to or generally parallel to the longitudinal extents of their respective cords rather than in spiral or helical patterns. Further, as is well known in the line and cordage industry, cords which are made in solid braided patterns do not have natural open axial passages therein; although they have relatively high degrees of deformability and they are therefore relatively easy to knot. However, when the casings 22 are formed in solid braid patterns over the core elements 20 in the gangion lines 14, they are forced to take on unnatural tubular or hollow configurations; and as a result, they are firmly secured to their respective core elements 20 by a tight grasping effect which essentially prevents relative longitudinal movements between the casings 22 and their respective core elements 20. The casings 22 are preferably coated with a suitable water resistant resin material which further increases the stiffness level of the gangion lines 14. In particular, a resin, such as a nylon, polyurethane, acrylic, or polyester resin, is preferably impregnated into the filaments of the strands 24 in the casings 22 in order to further increase the stiffness level of the casings 22 and the overall stiffness level of the gangion lines 14.

It is seen, therefore, that the instant invention provides an improved longline assembly and specifically one which includes gangion lines having significantly improved physical characteristics. In particular, the gangion lines 14 have predetermined stiffness levels which are dictated by the stiffness levels of the core elements 20 thereof, and they have surface characteristics which are dictated by the casings 22 thereof. In this connection, the braided outer casings 22 make the gangion lines 14 easy to handle, and they provide surface characteristics which minimize the tendency for the gangion lines 14 to produce noise as a result of scraping on the ocean bottom during undulation in the water. Still further, the braided outer casings 22 enable the gangion lines 14 to be easily knotted and to be effectively terminated with crimping sleeves without producing stress cracks. Accordingly, for these reasons as well as the other reasons hereinabove set forth, it is see that the longline assembly of the instant invention represents a significant advancement in the art which has substantial commercial merit in the fishing industry.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A longline assembly comprising a longline element, a plurality of spaced gangion lines attached to said longline element and hook means on the outer extremities of said gangion lines, said gangion lines each comprising a core element of a predetermined stiffness and an outer casing on said core element, said outer casings each comprising a plurality of individial strands which are tightly interlaced over the respective core element thereof, said strands being interlaced in a solid braid pattern wherein each strand extends alternately in substantially longitudinal and transverse directions with respect to the longitudinal extend of the casing thereof so as to reduce relative longitudinal movement between said outer casings and the respective core elements thereof.

2. In the longline assembly of claim 1, said core elements further characterized as synthetic monofilament core elements.

3. In the longline assembly of claim 1, said strands further characterized as continuous multifilament strands.

4. In the longline assembly of claim 3, said strands further characterized as continuous synthetic multifilament strands, said core elements further characterized as synthetic monofilament core elements.

5. In the longline assembly of claim 1, said casings each further comprising a resin coating impregnated in the strands thereof.

6. In the longline assembly of claim 3, said casings each further comprising a resin coating impregnated in the strands thereof.

* * * * *